March 15, 1966 P. E. STUCKERT 3,239,895
APPARATUS FOR MOLDING ELECTRICAL CONNECTIONS
Filed Jan. 25, 1962 4 Sheets-Sheet 1

INVENTOR
PAUL E. STUCKERT
BY Thomas & Crickenberger
ATTORNEYS

March 15, 1966 P. E. STUCKERT 3,239,895

APPARATUS FOR MOLDING ELECTRICAL CONNECTIONS

Filed Jan. 25, 1962 4 Sheets-Sheet 3

March 15, 1966 P. E. STUCKERT 3,239,895

APPARATUS FOR MOLDING ELECTRICAL CONNECTIONS

Filed Jan. 25, 1962 4 Sheets-Sheet 4

3,239,895

APPARATUS FOR MOLDING ELECTRICAL CONNECTIONS

Paul E. Stuckert, Katonah, N.Y., assignor to International Business Machines Corporation, New York, N.Y., a corporation of New York Filed Jan. 25, 1962, Ser. No. 168,622
8 Claims. (Cl. 22—58)

This invention relates to an apparatus for making electrical connections and more particularly to electrical connections made with a solidifying amalgam.

There is provided according to this invention a means for making electrical connections without the application of heat to the electrical joint.

It is a feature of this invention to provide an electrical connection without putting stress on the electrical component involved.

According to one aspect of this invention a very tight electrical connection is made by using a solidifying amalgam, and the connection is equivalent in practice of a solder joint.

It is another feature of this invention to provide a tool which inserts and tamps the constituents of a solidifying amalgam when making an electrical connection.

According to a still further aspect of this invention a tool is provided which is rapid in operation and efficient in use to insert the constituents of a solidifying amalgam for the purpose of making a tight electrical connection.

Figure 1:
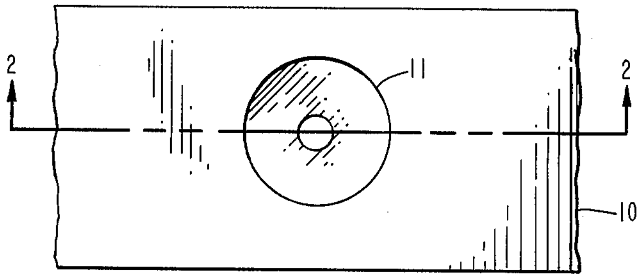
Figure 2:
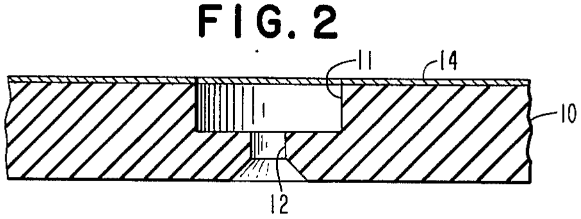
Figure 3:
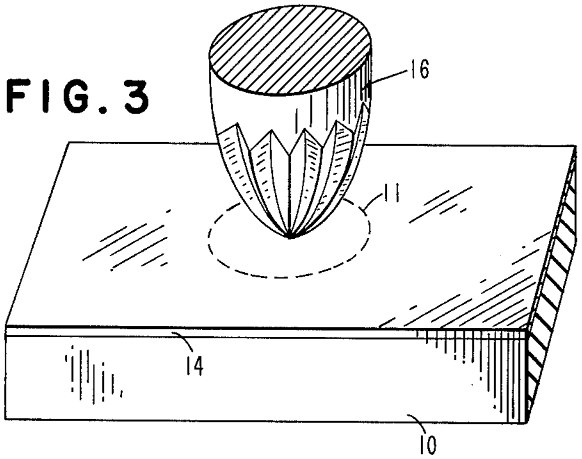
Figure 4:
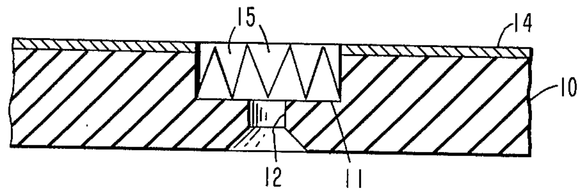
Figure 5:
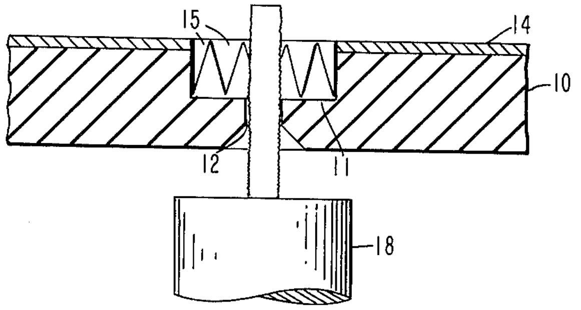
Figure 6:
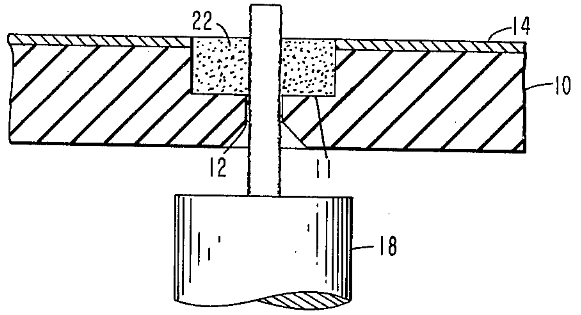
Figure 7:
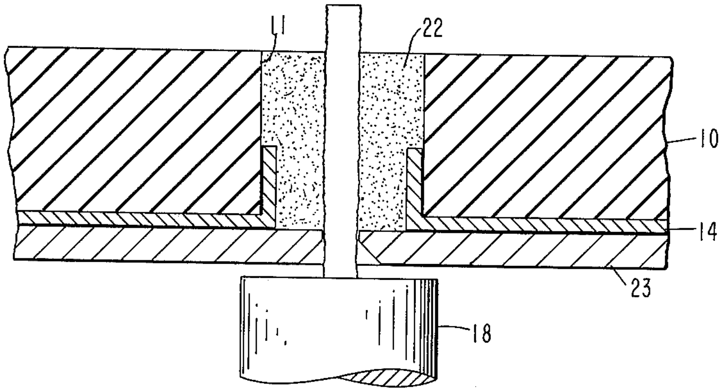
Figure 8:
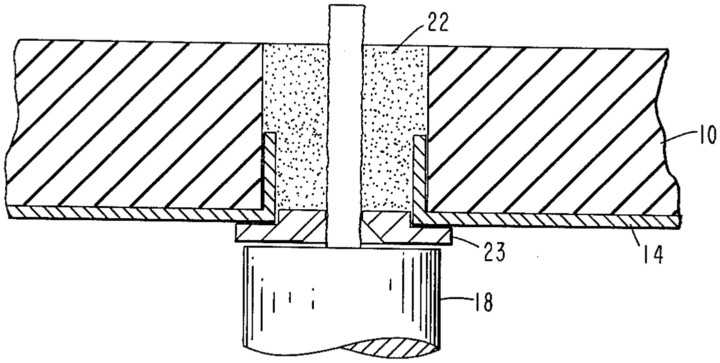
Figure 9:
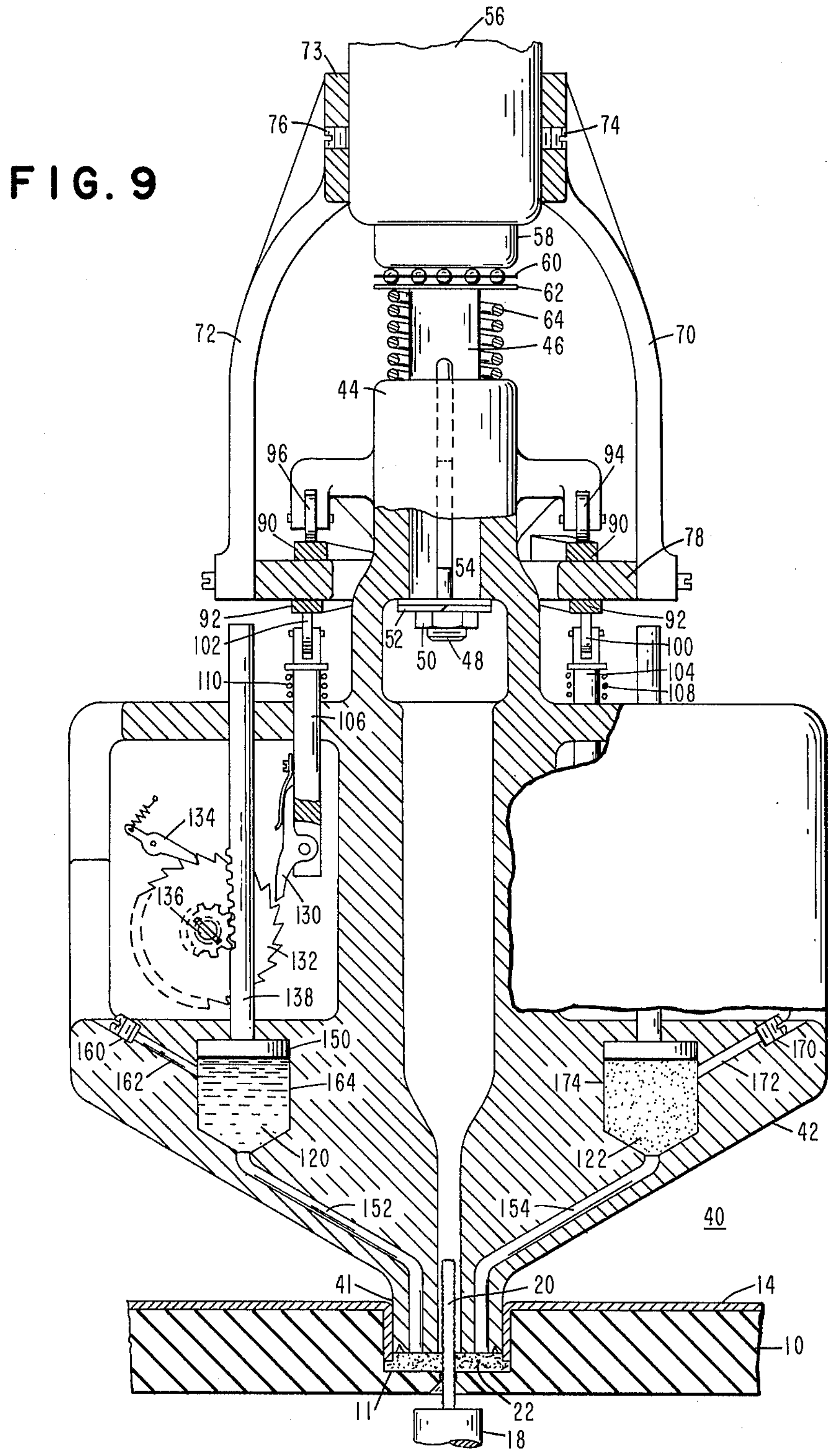

The foregoing and other objects, features and advantages of the invention will be apparent from the following more particular description of preferred embodiments of the invention, as illustrated in the accompanying drawings in which:

FIGURE 1 shows a substrate prepared for making an electrical connection according to this invention, FIGURE 2 is a cross-sectional view taken on the line 2—2 in FIGURE 1 with an electrically conductive sheet added to the upper surface of the substrate, FIGURE 3 is a perspective view of the substrate and conductive material thereon with a portion of a cutting and forming tool, FIGURE 4 is a cross-sectional view of a substrate and conductive sheet prepared for receiving an electrical component after inserting the tool shown in FIGURE 3, FIGURE 5 is a cross-sectional view of a prepared substrate and conductive sheet with an electrical component and electrical lead wire in place, FIGURE 6 shows in cross-section a completed electrical connection between an electrical component and an electrically conductive sheet, FIGURES 7 and 8 show in cross-section two alternative electrical connecting arrangements according to this invention, and FIGURE 9 shows a tool partially in cross-section for making electrical connections according to this invention.

Referring first to FIGURE 1, a substrate 10 having good electrical insulation qualities is prepared by providing a large hole 11 in the upper portion of the substrate 10 and a small hole 12 in the lower portion as illustrated in FIGURE 2. The small hole 12 in the lower portion is preferably tapered at the lower region as illustrated to facilitate component insertion.

Next a sheet of electrically conductive material 14 is attached as shown in FIGURE 2 to the upper surface of the substrate 10 by any suitable method which, for example, may include the use of an adhesive to cement the conductive sheet 14 to the substrate 10.

After the electrically conductive sheet 14 is attached to the substrate 10, the electrically conductive sheet 14 is pierced in the region of the large hole 11 in the upper portion of the substrate 10 by a tool 16, illustrated in FIGURE 3, which produces sharply scalloped edges 15 as shown in FIGURE 4. These edges are pressed into the hole 11, preferably by the tool 16 as it is inserted in the hole 11. This leaves the scalloped edges of the conductive material 14 disposed against the substrate around the large hole 11 in the upper portion thereof as illustrated in FIGURE 4.

An electrical component 18 having a lead or wire 20 is placed near the bottom portion of the substrate 10 with the lead 20 extending through the small hole 12 in the lower portion of the substrate 10 and through the large hole 11 in the upper portion as illustrated in FIGURE 5. The upper end of the lead 20 is preferably made to extend above the top surface of the electrically conductive material 14.

Next the constituents of a solidifying amalgam 22 are inserted in th large hole in the upper portion of the substrate 10 as shown in FIGURE 6, and the constituents are tamped and mixed as they are inserted, whereby the amalgam is compacted and bonded to the electrically conductive sheet 14 and the lead wire 20 of the electrical component.

Accordingly, it is seen that a novel method is provided for making an electrical connection with a solidifying amalgam which involves the steps of providing a substrate with good electrical insulation qualities, making a hole for receiving the constituents of an amalgam and the lead of an electrical component, providing an electrical conductor on the substrate with a portion of the electrical conductor extending into the hole where the amalgam is to be received, inserting the lead of an electrical component into the hole, inserting mixing and tamping the constituents of a solidifying amalgam, thereby compacting and bonding the amalgam to the electrical conductive materials to form a tight electrical connection.

The foregoing discussion has dealt with a method of making electrical connections where the component body and the conductor to be connected thereto are disposed on opposite sides of a substrate. It is desirable in some insances to make an electrical connection where the component body and the conductor to be connected thereto are disposed on the same side of a substrate. One arrangement for making such a connection is illustrated in FIGURE 7 where the same reference numerals are employed as in the preceding figures to identify corresponding parts. In FIGURE 7 the hole 11 extends entirely through the substrate 10 and a piece of insulation material 23 is disposed next to the conductive material 14 as shown. A hole is provided in the insulation material 23 through which the lead 20 extends. There is a tight fit between the insulation material 23 and the electrical lead 20, and this snug fit prevents escape of the amalgam during tamping. As illustrated in FIGURE 8, the insulation material 23 may have a configuration similar to that of the electrical component 18 where the electrical component may withstand some axial stress as a result of tamping.

In making preparations for an electrical connection according to this invention, the lead 20 of the component 18 is serrated or roughened as indicated in FIGURES 5 through 8. The serrated or roughened electrical conductor 20 is plated with gold, gold alloy or other suitable material which will amalgamate with the mercury. The electrically conductive sheet 14 may be any suitable electrical conductive material, and it is made of, or plated with, a material which will amalgamate with the mercury. For example, the sheet 14 may be a sheet of copper having plated on the upper surface in the region of the hole 11, gold, gold alloy or other suitable material which will amalgamate with the mercury. The constituents of the amalgam employed may be mercury with silver, tin, and copper or any other suitable materials that will amalgamate with mercury. Whatever the composition of the amalgam, it is necessary that the material plated on the serrated or roughened electrical lead 20 and the material plated on the electrically conductive sheet 14 in the vicinity of the hole 11 be materials which will amalgamate with mercury. Gold and gold alloys are suitable since they amalgamate with mercury. It is pointed out that amalgams may be divided into three categories: (1) those which undergo expansion, (2) those in which there is no significant change in volume, and (3) those which undergo contraction as the amalgam, with time, changes from a plastic to a solid. For the purpose of making a good electrical connection, it is desirable that an amalgam be used which undergoes expansion. If the constituents employed are properly tamped, a tight electrical connection is obtained by a slight expansion, and for this reason the amalgams in group (1) above are preferably employed. A large volume of literature is available on amalgams and resort may be made to such literature for the selection of constituents for the amalgam, the particle size of the solids involved as well as the proportions of the constituents to achieve the desired expansion. Reference may be made to an article entitled "Dental Amalgams" by Marie L. V. Gayler which was published in "The Journal Institute of Metals," volume IX of April 1936, and an article entitled "Dental Amalgam" by Herbert D. Coy et al. which was published in the February 1938 issue of "Dental Items of Interest."

A tool 40 for inserting the constituents of a solidifying amalgam is illustrated in FIGURE 9, partially in cross section. The tool 40 includes a neck portion 41 and a body member 42 having an upper yoke 44 integral therewith. A shaft 46 has a threaded member 48 in the lower end thereof, and a nut 50 and washer 52 are disposed on the threaded portion 48 as shown. The washer 52 and the nut 50 hold the yoke 44 on the shaft 46. A key way 54 is provided in the lower end of the shaft 46, and this shaft is secured to the yoke 44 by a key not shown which engages a recess in the yoke 44. Whenever the shaft 46 is rotated, it turns the yoke 44, but the yoke 44 is free to move up and down along the shaft 46 during the rotations.

A bushing 56, a thrust bearing face 58, a roller bearing arrangement 60 and a thrust plate 62 are disposed as shown at the upper end of the shaft 46. A spring 64 is disposed between the thrust plate 62 and the yoke 44, and this spring serves to urge the yoke 44 downward.

A pair of support arms 70 and 72 are made integral with an annular member 73, and the annular member 73 is secured to the stationary bushing 56 by screws 74 and 76. Attached to the lower portions of the support arms 70 and 72 is a cam support ring 78. Disposed on the upper surface of the cam support ring 78 is a cam 90, the surface of which has a sawtooth configuration, and disposed on the lower surface of the cam support ring 78 is a cam 92 the surface of which has a sawtooth configuration also. Disposed on the cam 90 are cam followers 94 and 96 which are connected to the yoke 44, and as the body 42 is rotated, it is caused to travel up and down as the cam followers 94 and 96 pass from the low points to the high points of the sawtooth like configuration of the cam 90. This up and down movement of the body provides the tamping action as the constituents of the amalgam are supplied to the hole 11 in the substrate 10 in the lower portion of FIGURE 9.

As the body portion 42 of the tool 40 is rotated, a pair of cam followers 100 and 102 are caused to move up and down as they pass through the low and high points of the sawtooth like configuration of the cam 92. This up and down motion of the cam followers 100 and 102 causes respective shafts 104 and 106 to be moved up and down. Springs 108 and 110 are mounted as shown in FIGURE 9, and they urge respective shafts 104 and 106 upwardly against the surface of the cam 92. The vertical movement of the shafts 104 and 106 causes the constituents 120 and 122 to be metered and supplied to the hole 11. The two metering devices are similar in construction, but only the one in the left portion of FIGURE 9 is illustrated in detail. Referring more specifically to the left portion of FIGURE 9, it is seen that the shaft 106 has a dog 130 mounted thereon, and the lower end of the dog engages teeth of a ratchet wheel 132, forcing the wheel to rotate in the clockwise direction whenever the shaft 106 is forced downwardly. When the shaft 106 moves upwardly, the dog 130 disengages the teeth of the ratchet wheel 132, and a pawl 134 engages the teeth of the ratchet wheel 132 and prevents counter-clockwise teeth of the rack portion on the rod 138, forcing the rod 13 fixedly mounted thereon, the teeth of which engage the teeth of a rack portion on a rod 138. As the ratchet wheel is rotated, the teeth of the pinion gear 136 engage the teeth of the rack portion on the rod 138, forcing the rod 138 downwardly in a step-by-step manner. Disposed on the lower end of the rod 138 is a piston 150 which operates in the cylinder 164 which contains one of the constituents of the amalgam. As the rod 138 is forced downwardly, a portion of the material 120 is forced through a cylindrical passage 152. In like manner, a portion of the material 122 is forced through a cylindrical passage 154. As shown in FIGURE 9, the injection of the materials 120 and 122 occurs at the same time because the surface of cam 90 against which the cam followers 100 and 102 bear have the same height. Actually, these heights may be varied whereby the material 120 may be injected before the material 122 or vice versa. These constituents are preferably forced into the hole 11 of the substrate 10 at that instant in time when the body 42 of the tool 40 is in its elevated position as determined by the cam 90. This permits the constituents 120 and 122 to be ejected more freely into the hole 11 as the tool 40 bears at this time with its minimum pressure on the amalgam 22. Filler plugs 160 and 170 are removed and a new supply of material 120 and 122 are entered through passageways 162 and 172 into the cylinders 164 and 174.

The tool 42 in FIGURE 9 is simple to operate. For the purpose of illustrating its operation, let it be assumed that an amalgam of mercury with silver and tin is to be employed for the purpose of making an electrical connection. The reservoir 164 is arbitrarily selected for holding mercury, and the reservoir 174 is arbitrarily chosen to hold the mixture of silver and tin in a finely ground state. After the reservoirs 164 and 174 are filled, the tool 40 is placed in the hole 11 with neck portion 41 of the tool extending into the hole. A passageway disposed centrally and axially of the tool 40 receives the lead 20 of the electrical component 18 whereby the electrical lead 20 is protected from damage and held in a straight position. The tool 40 is provided with a suitable driving means which drives the shaft 46 and gives the body 42 a rotary motion. The cam 90 and the cam followers 94 and 96 cause the body 42 to travel up and down the shaft 46, thereby imparting a tamping action on the amalgam 22. As the tamping action takes place, the constituents of an amalgam are injected into the hole 11 from the passageways 152 and 154 as previously explained. The face of the tool 40 is serrated, and this face bears against the amalgam 22 to provide additional mixing action as the tool 40 oscillates up and down during rotation. The rotary motion of the tool 42 tends to produce splashing of the mercury thereby insuring wetting of the scalloped edges 15 of the conductive material 14 and the serrated lead wire 20. The process of adding the constituents of the amalgam and tamping continues until the hole 11 is filled at which time the amalgam 22 is in compression between the electrical lead 20 and the scalloped edges 15 of the conductive material 14. The constituents of the amalgam may be varied to provide additional expansion upon solidifying, thereby yielding greater forces of compression. Where an amalgam of mercury with silver and tin is used, this amalgam may contain small amounts of copper to give hardness to the amalgam upon setting. As soon as the amalgam 22 fills the hole 11 flush with the upper surface of the conductive material 14, the power to the tool 40 may be turned off and the tool removed. The tool 40 may be readily adapted for use in automatic machines, whereby electrical connections of the type herein described may be made using mass production techniques. Accordingly, there is provided according to this invention a novel tool which automatically supplies metered amounts of the constituents of an amalgam to a hole where an electrical connection is to be made and which automatically mixes and tamps the constituents in the hole.

While the invention has been particularly shown and described with reference to preferred embodiments thereof, it will be understood by those skilled in the art that various changes in form and details may be made therein without departing from the spirit and scope of the invention.

What is claimed is:

1. A tool for making electrical connections including first means to hold the constituents of a solidifying amalgam, second means coupled to supply metered amounts of the constituents to a hole where two electrical conductors are to be connected, said tool having third means coupled to the second means for tamping and mixing the constituents as they are metered and supplied.

2. An instrument for making electrical connection including a base member having reservoirs disposed therein for holding the constituents of a solidifying amalgam, means coupled to the base member to rotate the base member, said base member having a neck portion with passageways leading from the neck portion to the reservoirs whereby the constituents of the solidifying amalgam may be supplied from the reservoirs through the neck portion to a place where an electrical connection is to be made.

3. The apparatus of claim 1 further including means coupled to the base member and the reservoirs for supplying controlled amounts of the constituents of the amalgam to the place where an electrical connection is to be made.

4. The apparatus of claim 2 wherein additional means is coupled to the base member to cause the base member to vibrate longitudinally during rotation whereby the lower region of the neck portion may be employed to tamp and mix the constituents of an amalgam in the place where an electrical connection is to be made.

5. A device used in making electrical connections including a base member having reservoirs for holding the constituents of a solidifying amalgam, means coupled to the base member to rotate the base member, said base member having an outlet at the lower extremity thereof with passageways leading from the reservoirs to the outlet whereby the constituents of the solidifying amalgam may be supplied from the reservoirs through the passageways to the outlet to the place where an electrical connection is made, means coupled to the base member to cause the base member to vibrate longitudinally during rotation of the base member whereby the lower region of the base member may be employed to tamp and mix the constituents of an amalgam in place where an electrical connection is made, and means coupled to the reservoir for metering the quantity of constituents of the solidifying amalgam through the passageways to the place where an electrical connection is made in response to the rotary motion of the base member.

6. The apparatus of claim 5 wherein the last named means includes pistons disposed in the reservoirs for forcing the constituents through the passageways to the place where an electrical connection is made, each piston having a rod coupled thereto and means coupled to each rod which responds to rotary motion of the base member and forces the pistons toward the passageways in the base member, thereby supplying metered amounts of the constituents of the solidifying amalgam to the place where an electrical connection is made.

7. A tool for making an electrical connection between electrical conductors comprising first means to hold the constituents of a solidifying amalgam, second means to supply metered amounts of said constituents to said connection point, and third means for mixing and compacting said constituents at said connection point as they are metered and supplied.

8. A tool for making an electrical connection between electrical conductors in a hole in a work piece comprising first means for holding the constituents of a solidifying amalgam, second means coupled to said first means to supply metered amounts of said constituents to said hole, and third means coupled to said second means for mixing and tamping said constituents in said hole as they are metered and supplied.

References Cited by the Examiner

UNITED STATES PATENTS

| | | | |
|---|---|---|---|
| 2,110,529 | 3/1938 | Rossignoi et al. | 113—133 |
| 2,358,144 | 9/1944 | Catlett | 113—133 |
| 2,862,239 | 12/1958 | Pollard et al. | 18—30 XR |
| 2,884,660 | 5/1959 | Austin | 18—5 |
| 3,008,221 | 11/1961 | Uebelmann | 29—155.55 |
| 3,025,591 | 3/1962 | Markowitz | 29—155.55 |

FOREIGN PATENTS

| | | |
|---|---|---|
| 291,523 | 6/1928 | Great Britain. |

J. SPENCER OVERHOLSER, *Primary Examiner.*

JOHN F. CAMPBELL, *Examiner.*